United States Patent [19]
Harry

[11] Patent Number: 5,945,917
[45] Date of Patent: Aug. 31, 1999

[54] SWATHING GUIDANCE DISPLAY

[75] Inventor: Scott E. Harry, Cedar Rapids, Iowa

[73] Assignee: Rockwell International, Costa Mesa, Calif.

[21] Appl. No.: 08/993,276

[22] Filed: Dec. 18, 1997

[51] Int. Cl.⁶ .............................. G08B 5/22; G08B 21/00
[52] U.S. Cl. .................. 340/815.45; 340/525; 340/988; 340/461; 340/684; 340/691.1; 340/691.6; 180/168; 180/900; 701/23; 701/50; 701/213; 56/1
[58] Field of Search .............................. 340/815.45, 525, 340/958, 684, 686, 461, 988, 990, 995, 686.1, 691.1, 691.6; 180/167, 168, 900; 701/23, 24, 50, 28, 211, 213; 56/1

[56] References Cited

U.S. PATENT DOCUMENTS

| | | | |
|---|---|---|---|
| 3,611,286 | 10/1971 | Cleveland | 200/61.44 |
| 5,428,546 | 6/1995 | Shah et al. | 340/990 |
| 5,485,385 | 1/1996 | Mitsugi | 364/449 |
| 5,493,494 | 2/1996 | Henderson | 364/424.01 |
| 5,717,593 | 2/1998 | Gvili | 364/449.1 |

*Primary Examiner*—Donnie L. Crosland
*Attorney, Agent, or Firm*—Kyle Eppele; James P. O'Shaughnessy

[57] ABSTRACT

A swathing guidance display for accurately guiding and navigating an agricultural product application vehicle is described. The invention aids in precision guidance of the application of agricultural products such as fertilizers and herbicides to reduce application overlap. The invention further provides assistance in planting operations without requiring the use of traditional markers, provides parallel swath guidance of an agricultural product application vehicle, and provides an apparatus which providing a vector for navigating an agricultural product application vehicle to a desired application location. The swathing guidance device includes a circular display having a plurality of illuminating radial vectors to indicate the direction of the desired course and course correction. Both guidance and navigational functions are provided.

24 Claims, 17 Drawing Sheets

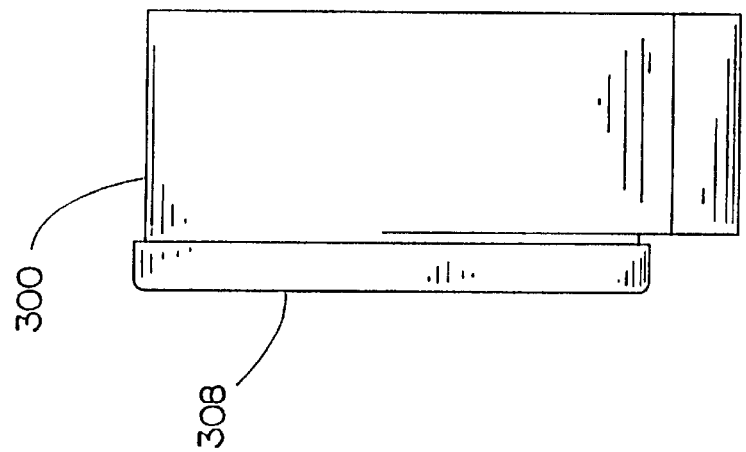
FIG. 4C
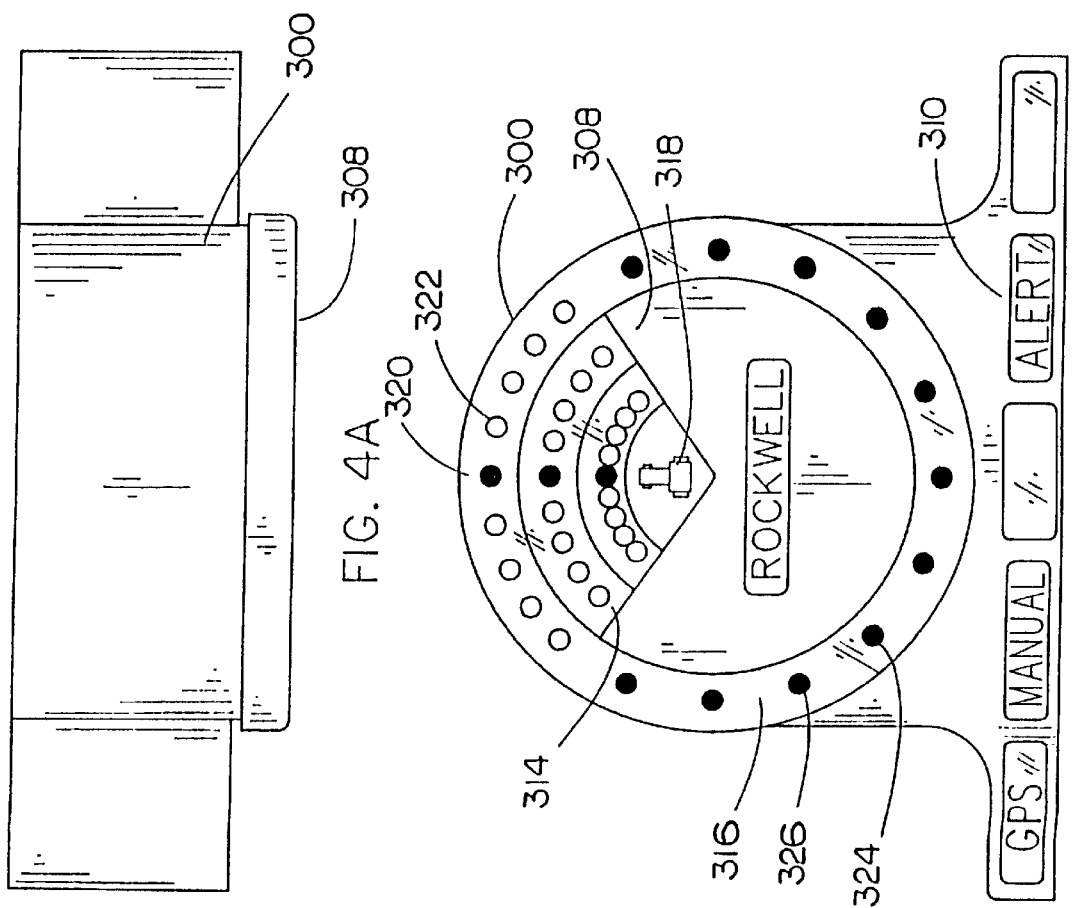
FIG. 4A
FIG. 4B

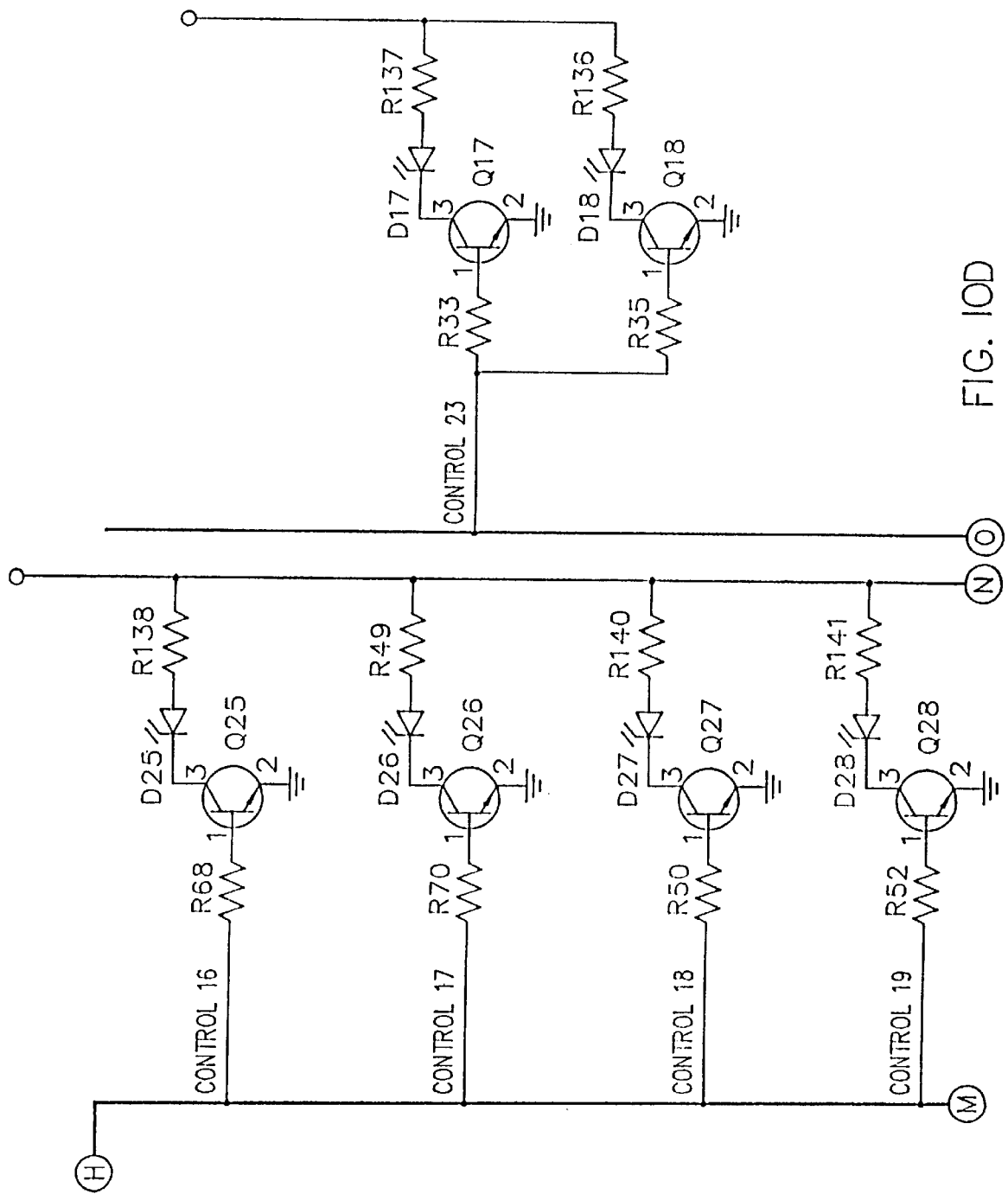
FIG. IOD

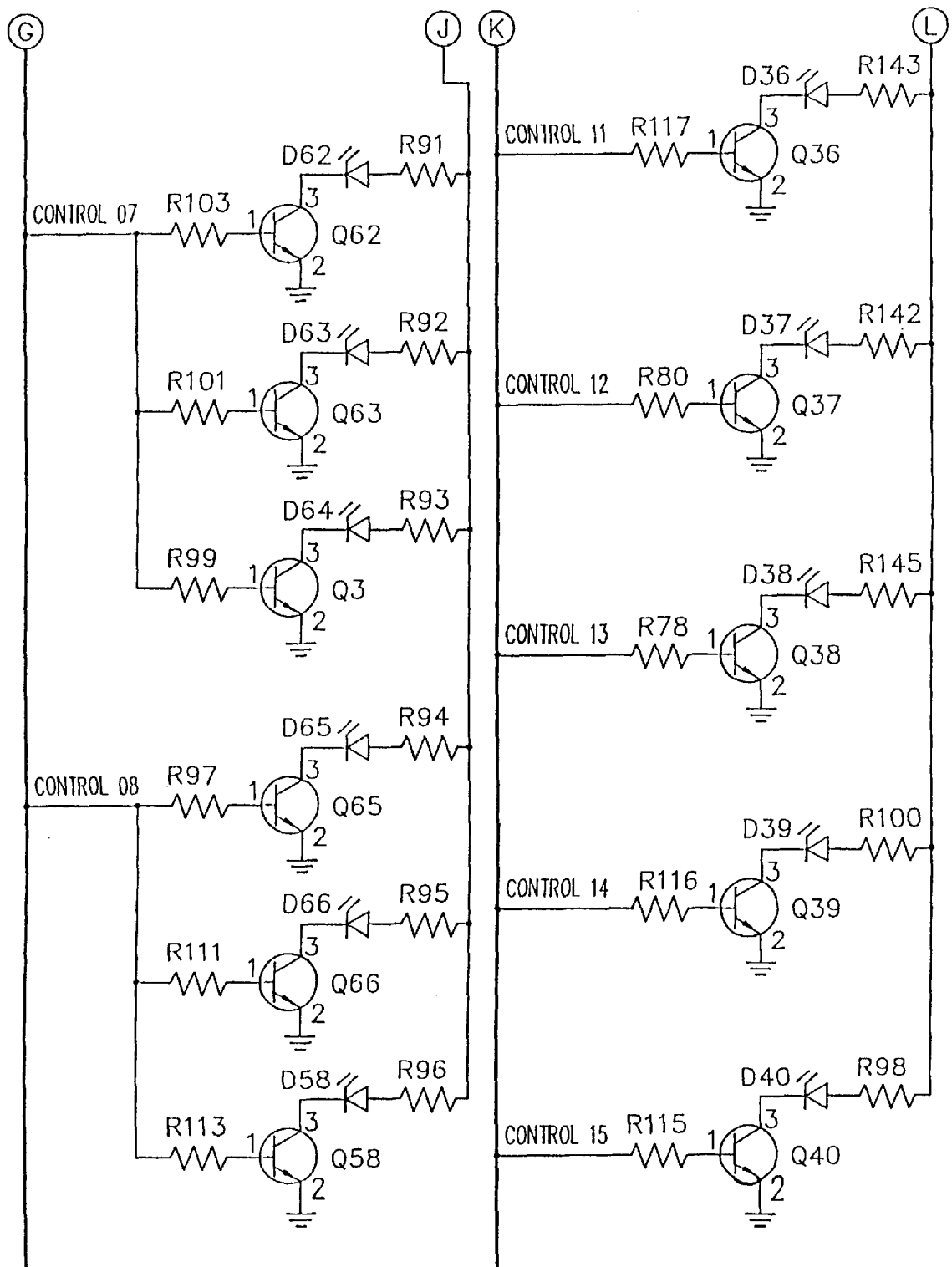
FIG. IOF

SWATHING GUIDANCE DISPLAY

BACKGROUND OF THE INVENTION

The present invention generally relates to the field of agricultural product application and more particularly to swathing guidance display for assisting in the application of agricultural products.

Presently existing agricultural product application guidance systems typically utilize a linear array or straight line of lights to indicate parallel swath guidance in aiding the steering of the applicator vehicle. However, these guidance systems only give an indication of relative direction (i.e. how far to the left or how far to the right) the vehicle is from the desired location. They do not indicate a vector pointing toward the actual desired location, they merely indicate the relative direction of the location or in which plane, the left or right the destination lies. With a straight light bar, the operator cannot tell if the desired location is in front of him, behind him, or to the immediate side. Thus, these straight line light bar guidance systems are incapable of indicating a vector. Further, these swath guidance systems are only capable of guiding the user along a straight line, but cannot indicate a new heading toward a new location once the end of that line is reached. Lastly, the straight light bar guidance system does not take into account arcuate paths of travel, allowing for the possibility of the user traveling in a continuous circle about the desired location while never reaching the actual destination.

SUMMARY OF THE INVENTION

Accordingly, it is a goal of this invention to provide a method and apparatus for accurately guiding and navigating an agricultural product application vehicle. The present invention aids in precision guidance in the application of agricultural products such as fertilizers and herbicides to reduce application overlap. The present invention also provides assistance in planting operations without requiring the use of traditional markers.

Another goal is to provide a method and apparatus for providing parallel swath guidance of an agricultural product application vehicle.

It is a further goal of the present invention to provide a method and apparatus for providing a vector for navigating an agricultural product application vehicle to a desired application location.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 4A–4C illustrate a plan view, an front elevation view and a side elevation view of a swathing guidance display in accordance with the present invention;

FIGS. 10A–10G, 11, and 12A–12C are schematic diagrams of the electronic circuitry of a swathing guidance device in accordance with the present invention.

DESCRIPTION OF THE PREFERRED EMBODIMENT

Reference will now be made in detail to the presently preferred embodiment of the invention, an example of which is illustrated in the accompanying drawings.

Figure 1:
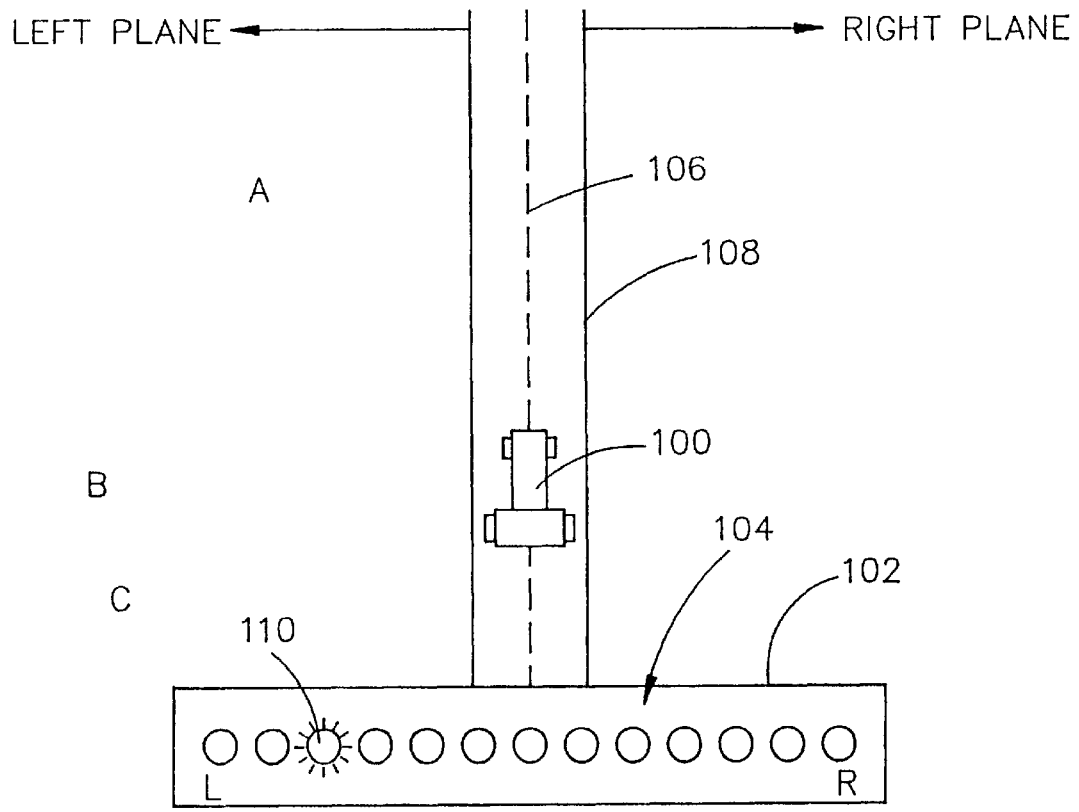
FIG. 1 is an illustration of a prior art swath guidance system using a linear array of lights.

Referring now to FIG. 1, an illustration of a prior art swath guidance system is shown. The swath guidance system shown in FIG. 1 guides an agricultural vehicle 100 along a swath of land to which it is desired to apply an agricultural product, for example, herbicide, seed, etc. The prior art guidance system device 102 uses a linear array of lights 104 for providing general steering corrections in order to assist the operator of the vehicle to maintain a straight line of travel 106 along a particular swath 108. When the vehicle 100 deviates from line 106, the guidance device 102 indicates the direction in which to make a course correction (i.e. to the right or to the left) and relative magnitude of the course correction. Typically only a single light is illuminated at a time. For example, if the vehicle deviates to the right of line 106, a light 110 will illuminate to indicate to the operator to steer to the left. As the operator makes course corrections, the illuminated light 110 will be turned off and an adjacent light will be illuminated to indicate the result of the correction. The operator continues to make course corrections until the center light of the array 104 is illuminated thereby indicating that the course of the vehicle coincides with line 106.

The prior art guidance device 102 is capable of providing for slight course corrections in the heading of the vehicle within the confines of a single swath 108. However, the prior art guidance device is not capable of providing navigational information to relocate or redirect the vehicle to a new swath, to a destination point in either the left plane or the right plane outside of the swath, or to accommodate a swath of a widely variable pattern. For example, the linear array device 102 cannot redirect the vehicle to points A, B or C because the device is only capable of providing relative directional headings. For example, the left-most light in the array 104 may indicate a directional heading toward point A. The device would then be incapable of directing the vehicle to either points B or C because the array could not distinguish between the two points. Thus, the prior art swath guidance system is only capable of directing the vehicle between a limited heading angle delimited by the heading rays corresponding to the left-most and right-most lights of the array 104.

Figure 2:
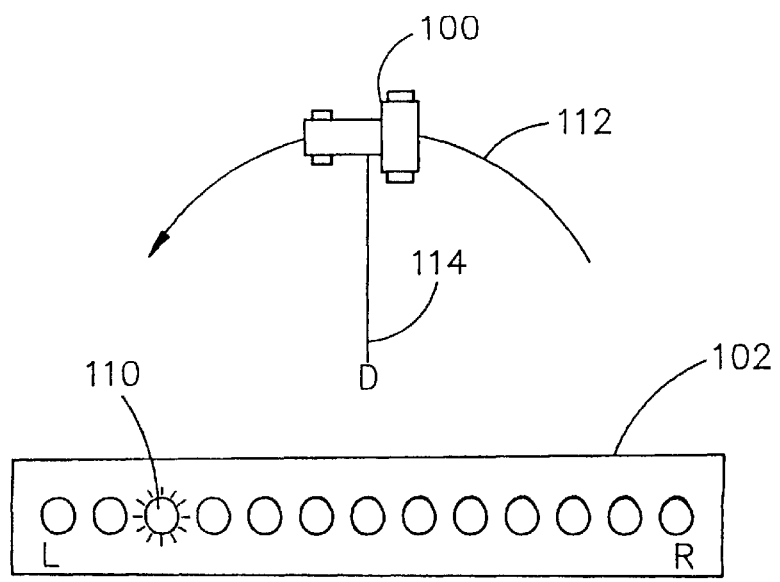
FIG. 2 is an illustration of the prior art swath guidance system of FIG. 1 illustrating a continuous arcuate path condition.

Referring now to FIG. 2, a further problem of a linear array swath guidance device is shown. The angular directional limits of the prior art device are shown in FIG. 1. For example, if the vehicle needed to be redirected to point D, and point D was located relative to the vehicle to be outside the maximum angular directional limits of the device 102, the device will be incapable of indicating the direction to point D. Thus, when left-most light 116 is illuminated, the vehicle 100 will be directed along arcuate path 112 which does not intersect with point D. In the case where point D is located at the center of a circle defined by path 112 and at a distance 114 from the vehicle 100 corresponding to the radius of the circle, the vehicle 100 will be directed to constantly circle around point D but never reach it. Thus, valuable time will be wasted time and confusion of the operator will abound.

Figure 3:
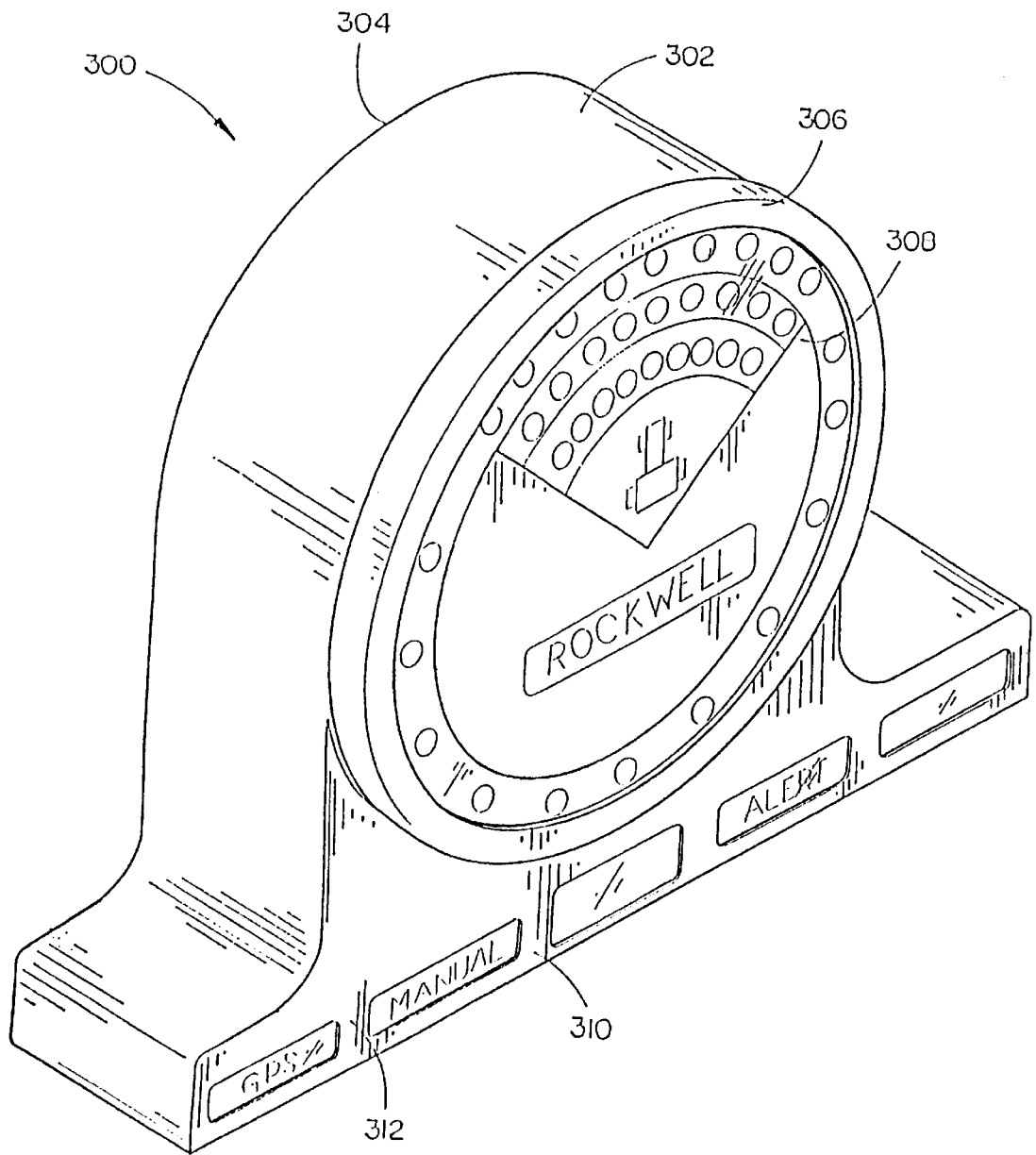
FIG. 3 is an isometric illustration of a swathing guidance display in accordance with the present invention.

Referring now to FIG. 3, an isometric illustration of a swathing guidance display in accordance with the present invention is shown. The swathing guidance device 300 comprises a housing 302 having a rear portion 304 and a frontal portion 306. A circular frontal face being a primary display 308 is disposed on the frontal portion 308 of the swathing device upon which guidance information is displayed. A secondary display 310 is also disposed on the frontal portion 310 of the device housing 302 for displaying additional guidance information. Secondary display 310 may be the frontal portion of a modular unit 312 which may be removable if only the circular frontal display information 308 is desired. The circular frontal display 308 preferably provides information in an analog-type format while the secondary display 310 preferably provides information in a digital-type format.

Referring now to FIGS. 4A–4C, a plan view, an front elevation view and a side elevation view of a swathing guidance display in accordance with the present invention are shown. As can be seen from FIGS. 4A–4C, the swathing guidance device has a general size, shape and form somewhat similar to that of a baby grandfather clock since the device 300 provides a circular frontal display 308 being somewhat similar to a clock face.

The primary display 308 comprises two subunits. The first subunit may be referred to as the guidance mode display 314 comprising a triangularly shaped top section of the primary display 308. The second subunit may be referred to as the navigation mode display 316 comprising an outer annular ring at the circumference of the circular frontal face 308. A reference vehicle icon 318 may be disposed at the center of the circular frontal face 308 to indicate the forward direction of travel of the vehicle with respect to the guidance information displayed on the primary display 308.

The circular primary visual display preferably utilizes multiple, colored LED's that will prompt the user for the vehicle's direction, deviation from desired course, distance to and direction of next turn, and location with respect to a desired point. The display device 300 also includes system alerts requiring operator actions (e.g., activate or deactivate product applicator). The position information may be supplied by a host system capable of determining headings and guidance information.

The swathing guidance device 300 thus has two modes of operation: guidance and navigation. The guidance device 300 operates in the guidance mode when the vehicle is considered to be "parallel" to the desired path. Parallel is a user defined value which is considered to be accurate enough for the particular application, thereby allowing small angles of deviation from the desired linear path as acceptable error. When the vehicle with which the guidance device is utilized is on the desired course, a vector of lights, preferably light emitting diodes (LED's), is displayed in an upright position. If the vehicle deviates to the left of the desired course, the first vector to the right of straight up is illuminated, thereby indicating to the user to correct the course of the vehicle to the right. As the deviation increases, the next vector is illuminated. This process continues with increasing deviation until the vehicle is no longer within the predetermined range of user defined parallel. If the vehicle corrects course the vector will return to the vertical position. If the vehicle is required to make a turn an LED on the circle will flash indicating the desired direction to turn. As the turn is executed the illuminated LED will move toward the top of the circle until the vehicle is on the desired parallel path. When the vehicle is within 999 units (e.g., feet or meters) of the turn point the display will indicated the distance to the turning point. When the turn is complete, the distance display will turn off.

When the vehicle has left the defined parallel requirements the display goes into navigation mode. In navigation mode a single LED on the circle is lit. The lit LED represents the desired direction of travel with respect to the vehicle. For example, if the desired location is directly behind the vehicle the LED at the 180 degree position will be lit. As the driver turns, for example to the right, to obtain the position the LED will move up one position to the right side of the circle. This will continue until the user returns to the guidance mode or has navigated to the desired position in the field. When navigating to a desired position in the field the digital display will indicate the distance to the position The guidance display 314 comprises a plurality of linear arrays of lights, or vectors. The vertical vector is illuminated when the vehicle 100 is on course of a desired swath, and the remaining vectors are not illuminated. As the vehicle 100 deviates to the left of the desired swath, the vector to the right 322 will illuminate and the vertical vector will be turned off, thereby indicating to the operator of the vehicle to adjust the course of the vehicle to the right. As the deviation to the left of the desired course is increased, succeeding vectors at an increasing angle away from the vertical vector 320 are illuminated as preceding vectors are turned off. The angle of the illuminated vector with respect to the vertical vector 320 is preferably proportional to the amount of angular deviation of path of travel of the vehicle from the desired course. Because of the radial arrangement of the vectors with respect to the center of the display, the vectors represent a more accurate directional course heading adjustment than the linear array of the prior art, that is the vectors of the display actually point in the direction of the correctional heading. Further, the display of the present invention is more easily readable than the prior art display since multiple lights are illuminated in a line to indicate the correctional heading.

The guidance device of the present invention further provides navigational information beyond small swathing course corrections. The navigational display disposed at the circumference of the frontal face provides information to the operator to navigate the vehicle to a new location that may be disposed at some distance away from the present swath. Thus, upon completion of a first swath, if the beginning point of the next desired swath is located 135 degrees to the left with respect to the present vertical vector 320, then navigation light 324 will illuminate to indicate such a direction. Further, the secondary display 310 may indicate the distance to the swath beginning point, thereby providing a true vector to the desired location. As the course of the vehicle is adjusted to the left as it heads to the new location, the next succeeding clockwise light 326 illuminates and the previous light 324 is turned off. This process continues until the direction of the vehicle coincides with the new desired location and the vertical vector 320 is illuminated. Upon reaching the destination of the new desired location, the guidance device enters into guidance mode and application of the agricultural product may proceed.

Figure 5:
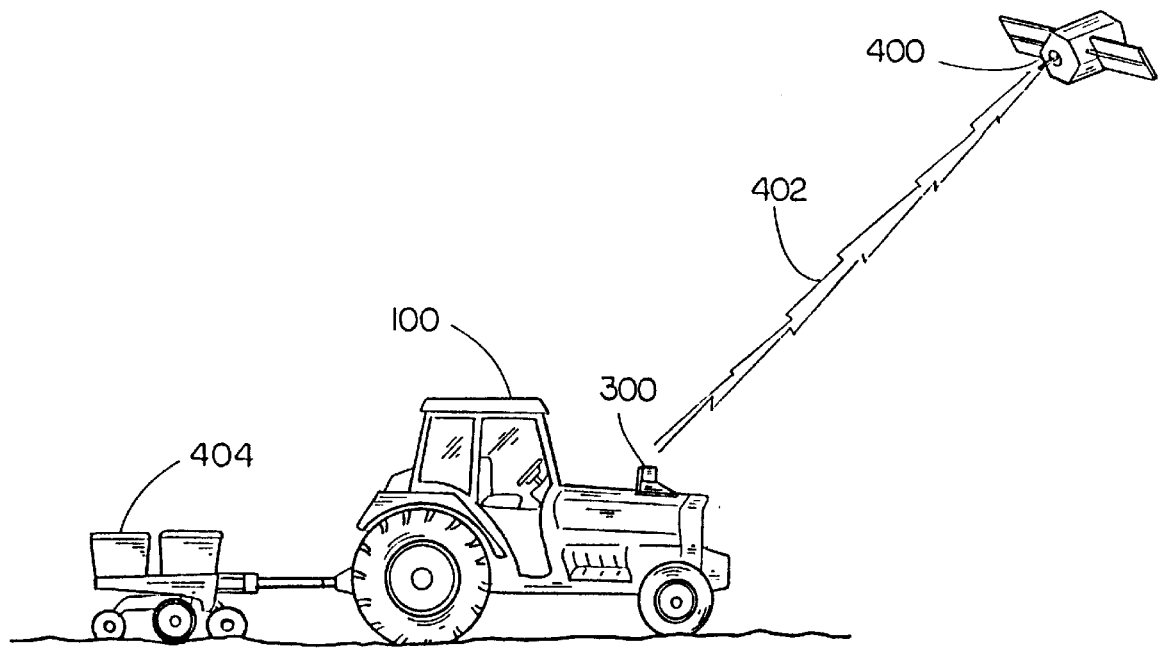
FIG. 5 is an illustration of the present invention as utilized in a differential global positioning system.

Referring now to FIG. 5, an illustration of the present invention as utilized with a global positioning system is shown. The swathing guidance device 300 may be utilized in an agricultural vehicle 100 using a global positioning system for providing coordinate and time data. The global positioning system may utilize a constellation of satellites with a radio-frequency communication link 402 to provide position and time reference data to the proper equipment which may be installed within the vehicle 100. Such a global positioning system is provided by the United States government for civilian use. Further, since the service provided by the U.S. government for civilian use is intentionally degraded for national security purposes, accuracy enhancement techniques may be utilized, for example a differential global positioning system, in order to provide positioning and time data having an improved accuracy if desired. The global positioning system aids in navigating the application of the agricultural product 404 at the desired areas.

Figure 6:
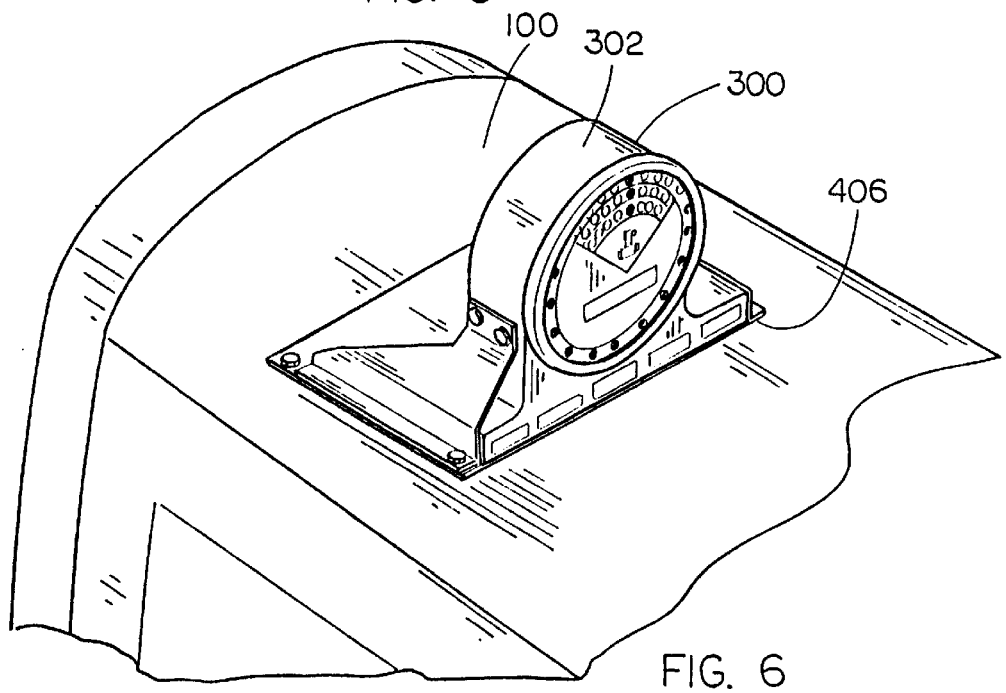
FIG. 6 is an illustration of the present invention as installed on an agricultural vehicle.

Referring now to FIG. 6, an illustration of the present invention as installed on an agricultural vehicle is shown. The swathing guidance device may be mounted external to the passenger compartment of the vehicle within the view of the operator such as on the hood of the vehicle. The housing 302 of the guidance device is preferably constructed to withstand such an external mounting in which it may be exposed to weather extremes. Thus, the housing may be a ruggedized steel, aluminum or plastic housing having weather sealing to weather proof the internal components from rain, snow, dust, etc. Further, the guidance device may be mounted on a shock proof mounting 406 to dampen mechanical vibrations. The device is connected to the power system of the vehicle 100 for providing operational power, and may be further connected with a communications link to navigational equipment installed in the vehicle. The device may also be mounted within the passenger compartment as well such as on a dash or similar area of the vehicle.

Figure 7:
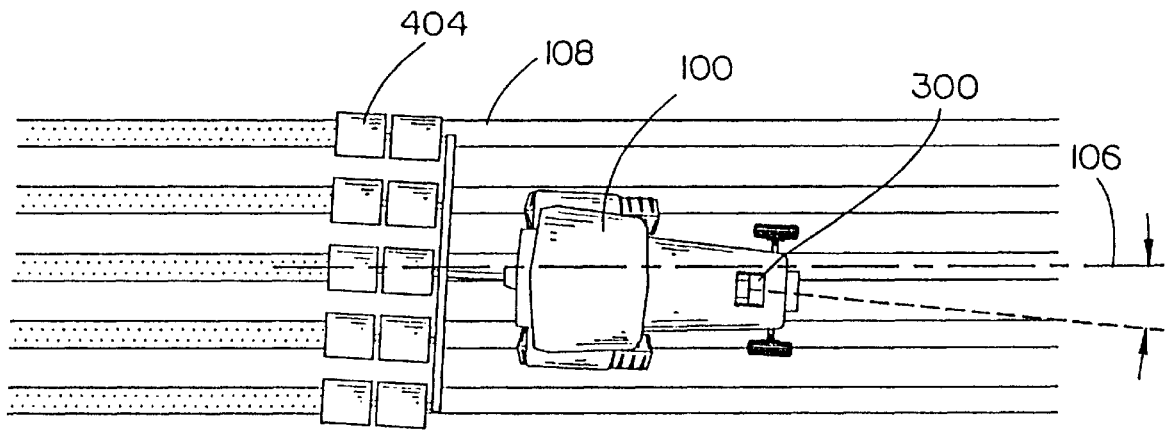
FIG. 7 is an illustration of the swathing guidance function of the present invention.

Referring now to FIG. 7, an illustration of the swathing guidance function of the present invention is shown. As the vehicle deviates from the desired path 106, the global positioning system equipment receives positioning and time information from the global positioning system constellation 400 to calculate a the actual heading of the vehicle and translates the deviation information into display information which is displayed on the guidance system 300. The operator of the vehicle may then make the necessary course corrections to maintain the path of the vehicle along the desired path 106 such that the agricultural product 404 is accurately applied within the swath 108.

Figure 8:
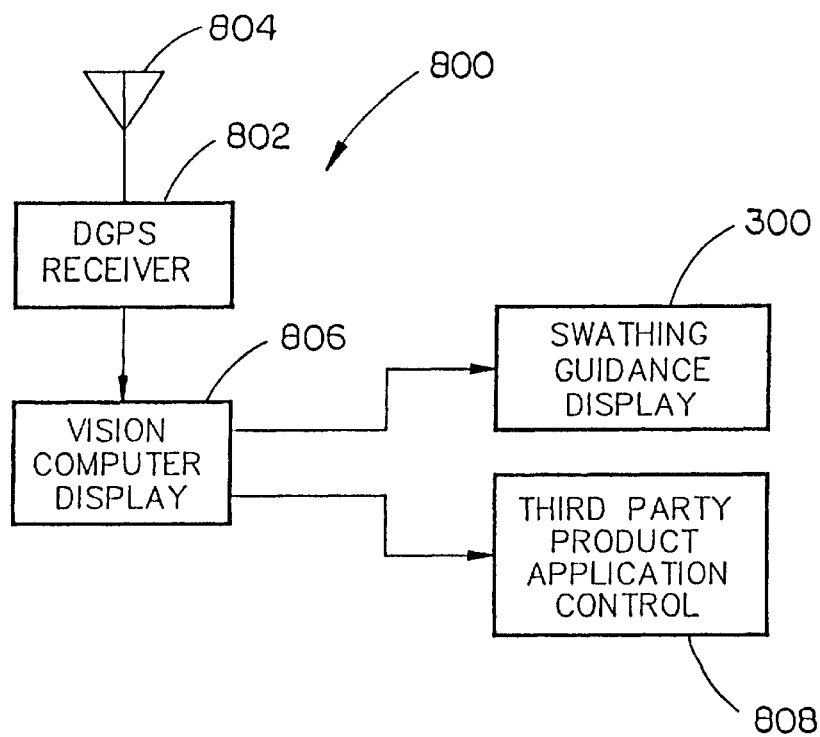
FIG. 8 is a block diagram of a global positioning system application with which the present invention may be utilized.

Referring now to FIG. 8, a block diagram of a global positioning system application with which the present invention may be utilized is shown. The application 800 may include a differential global positioning system receiver 802 having an appropriate antenna 804 for receiving the global positioning system signal. The global positioning system receiver 802 interfaces with a computer and display system 806 which is installed within the agricultural vehicle 100. The computer interfaces with the swathing guidance display 300 of the present invention and with a third party product application control system 808. The product application control system may be a software program, for example, that runs on the computer 806 and which tracks the time, date, location, type product applied and area of coverage of applied agricultural products. This type of application 800 is capable of controlling and managing the agricultural products applied to particular fields in order to increase yields, for example.

Figure 9:
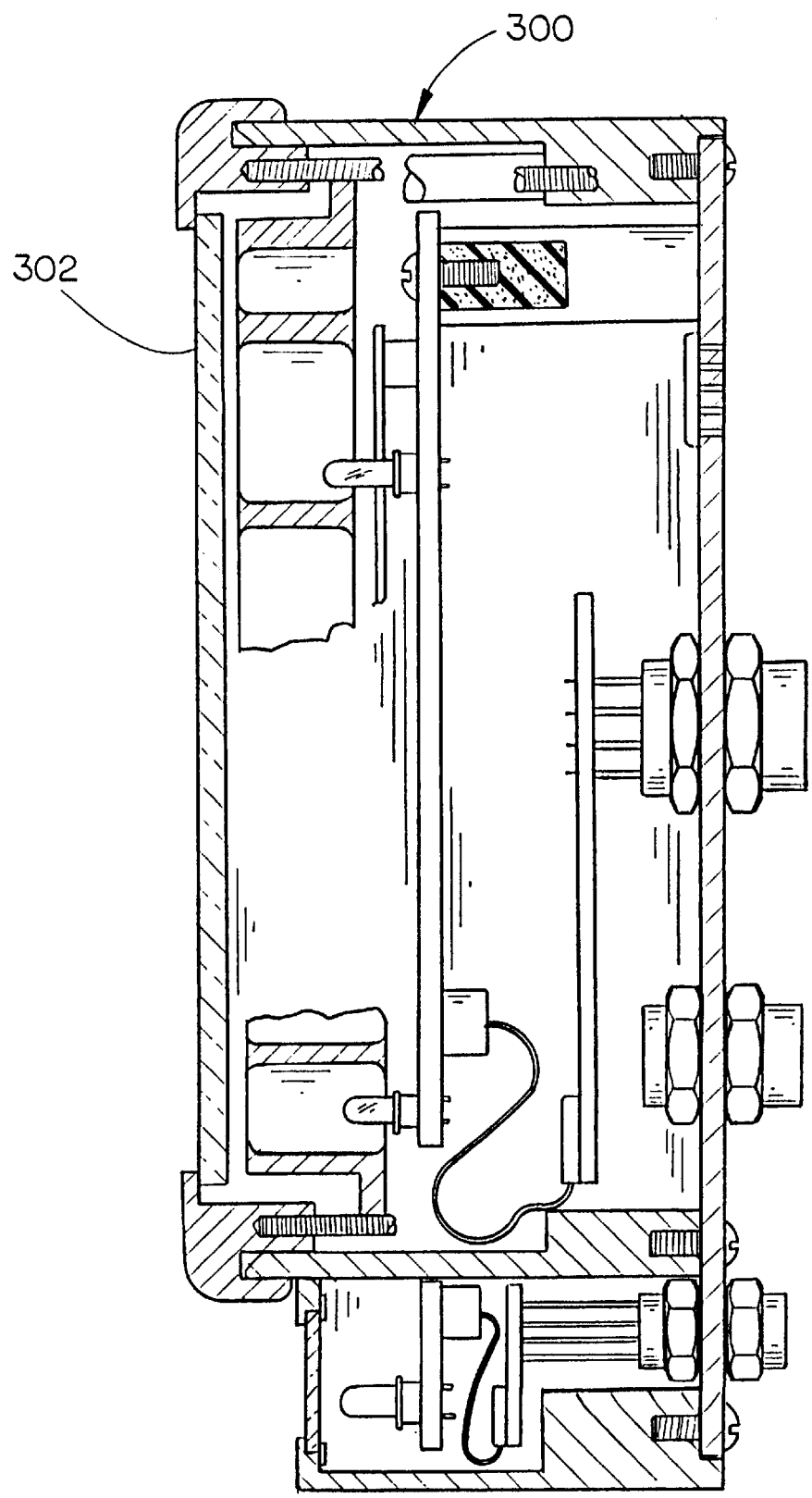
FIG. 9 is a side cutaway illustration of the swathing guidance device of the present invention.
Figure 10A:
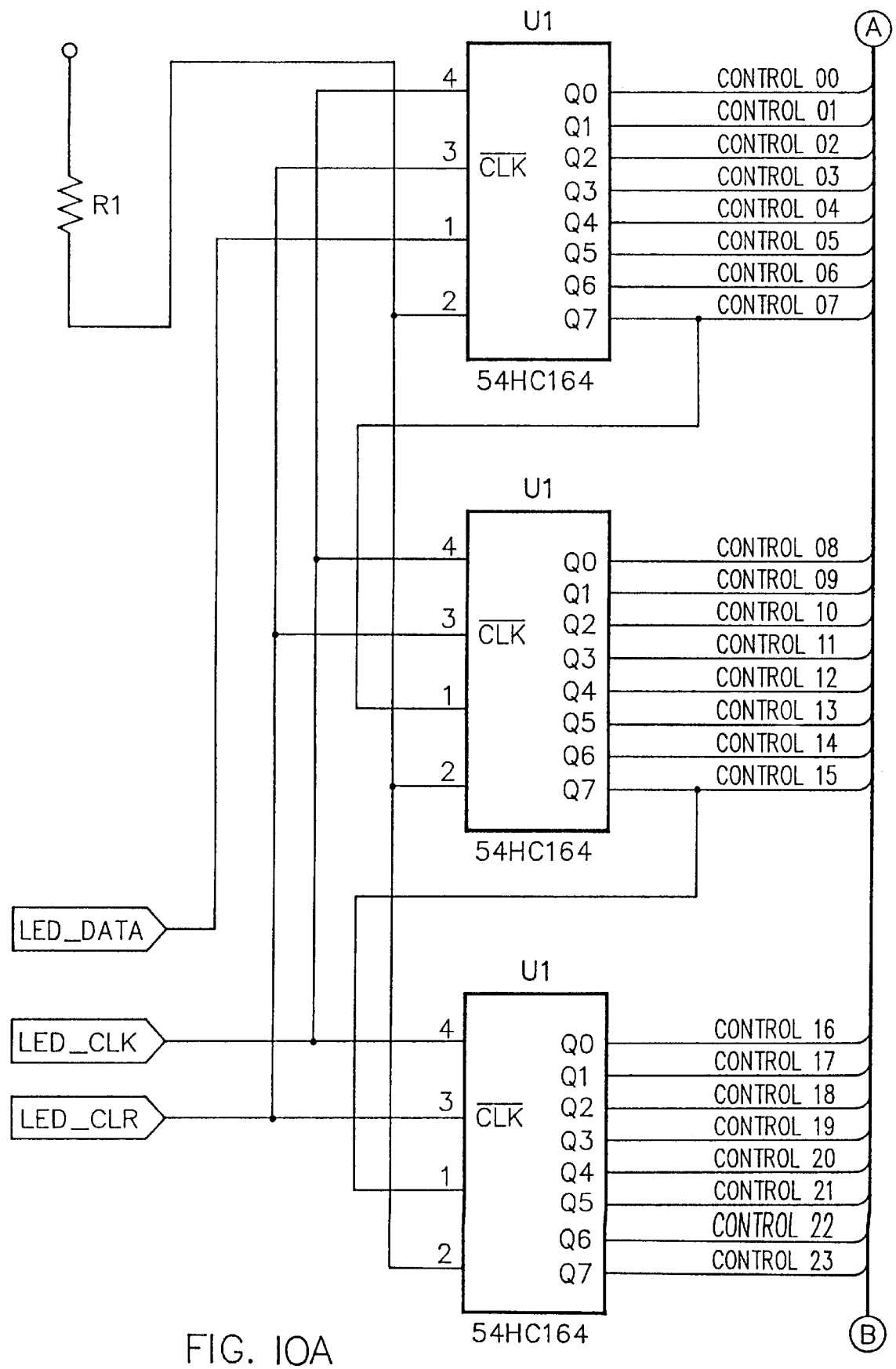
Figure 10B:
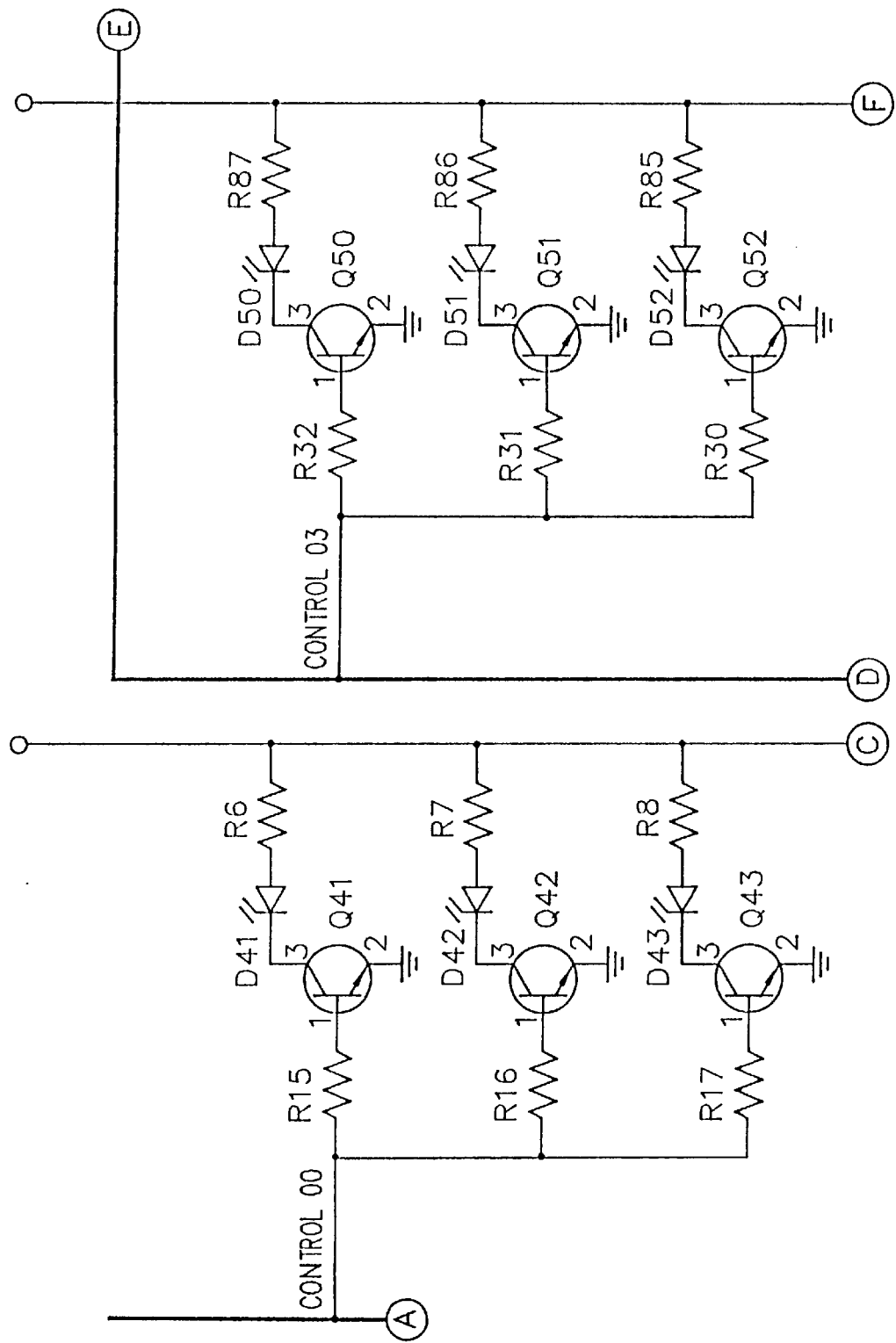
Figure 10C:
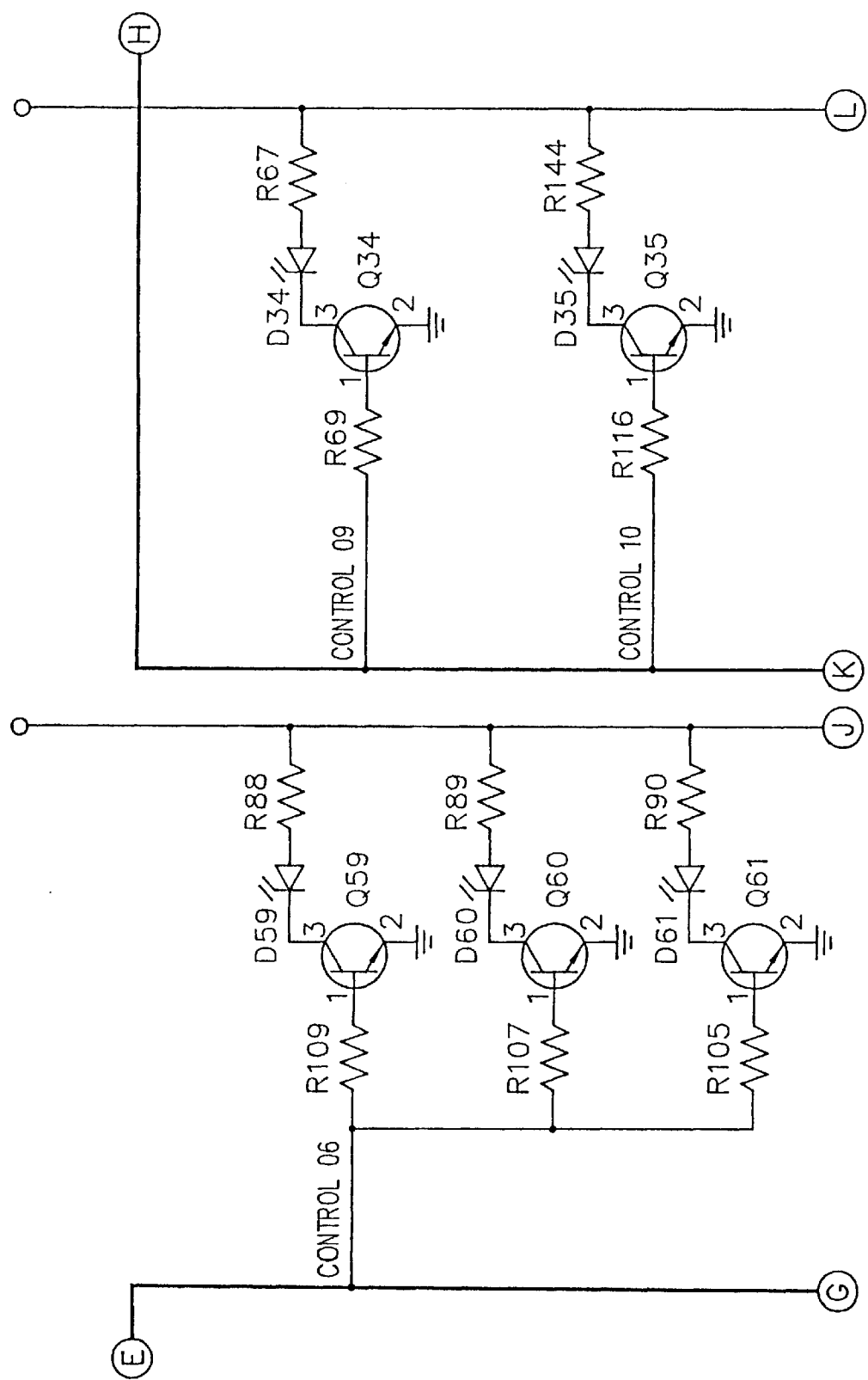
Figure 10E:
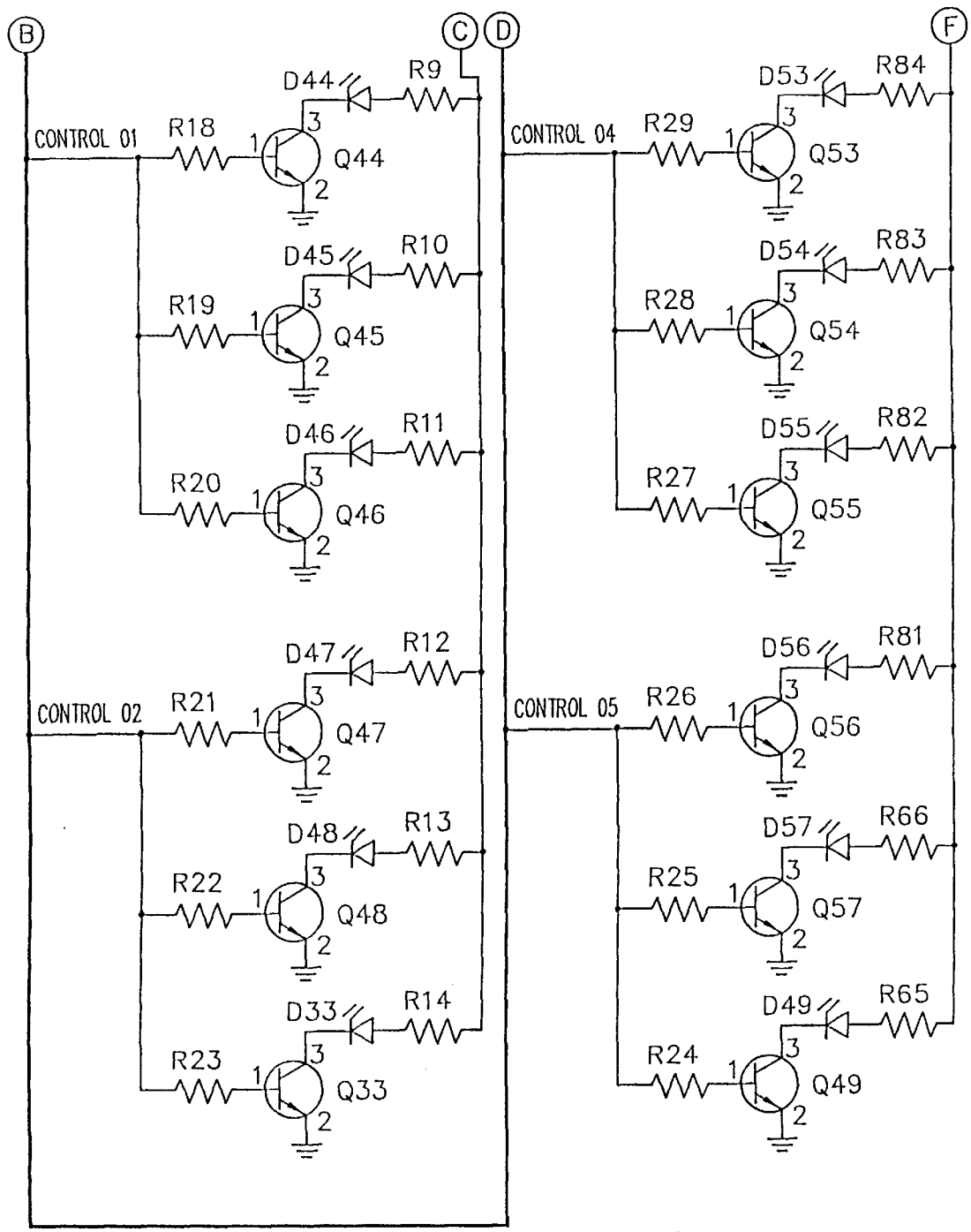
Figure 10G:
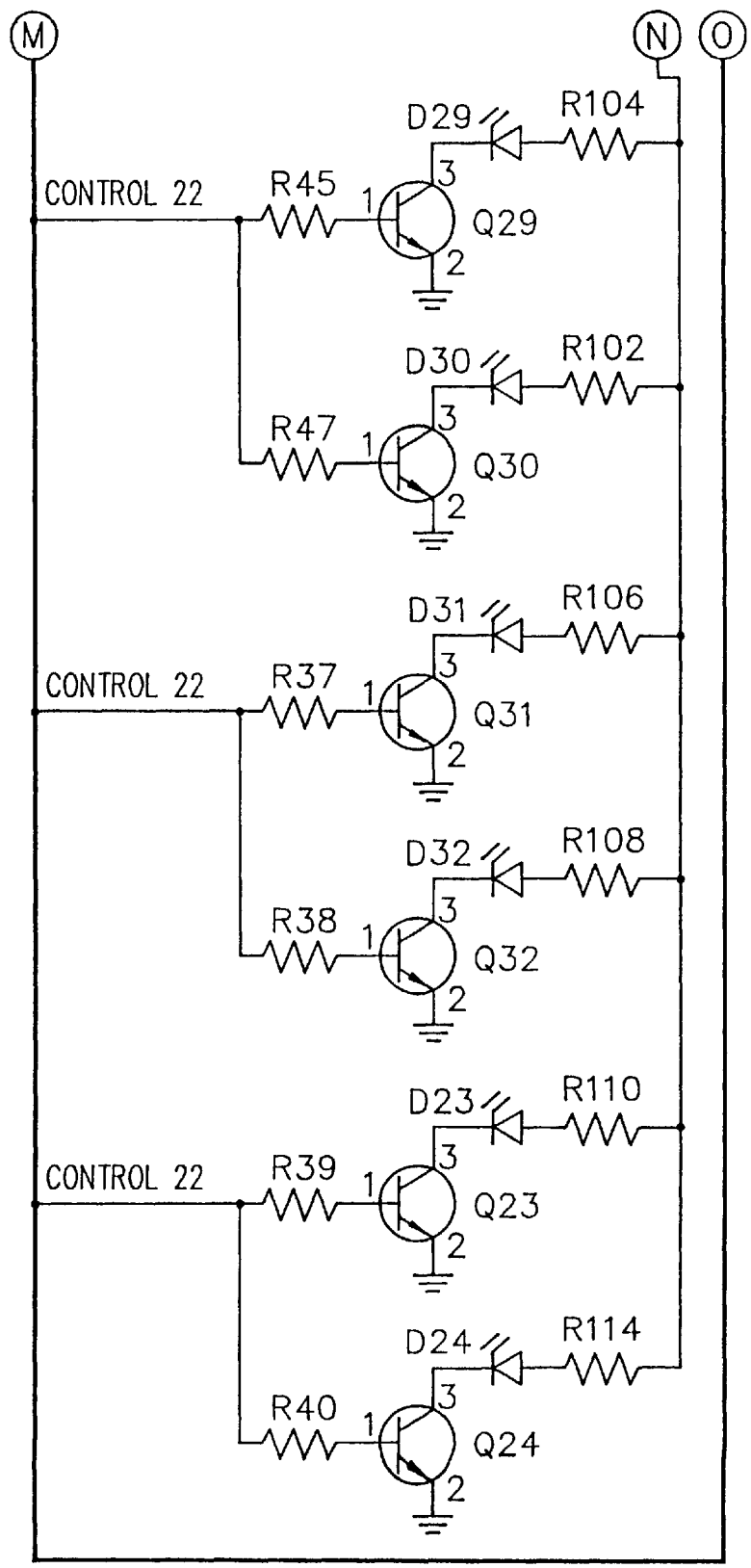
Figure 11:
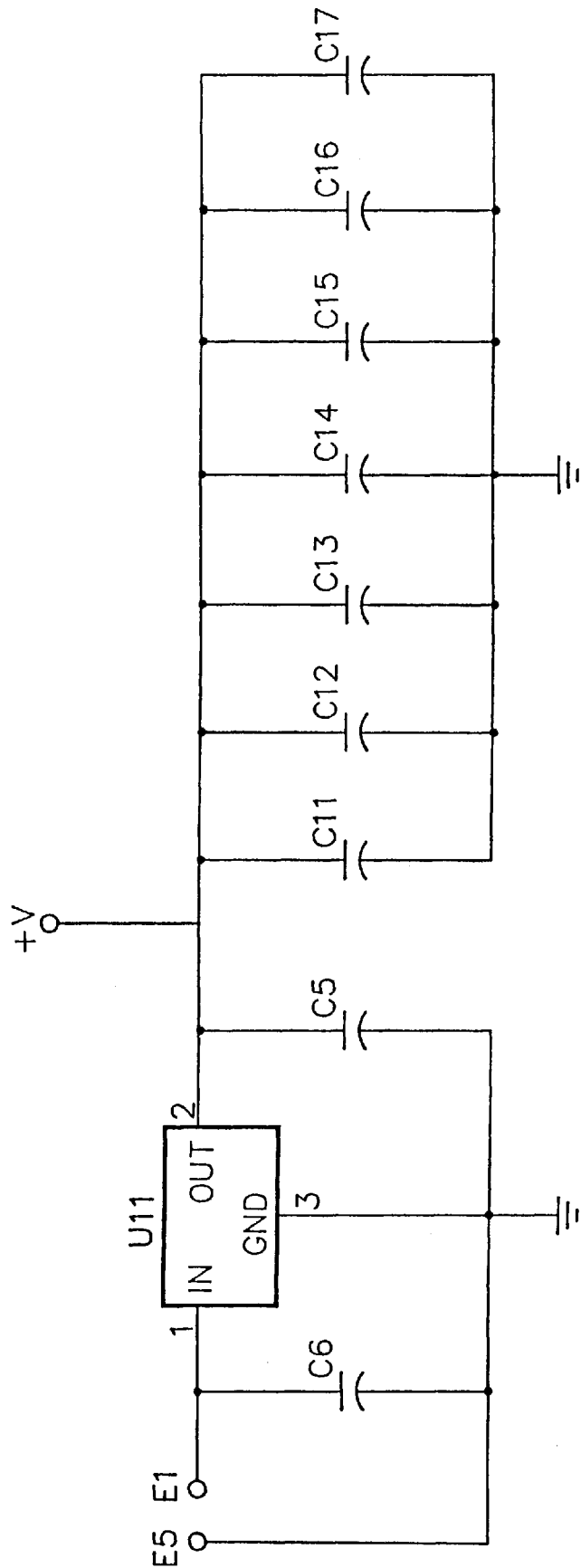
Figure 12A:
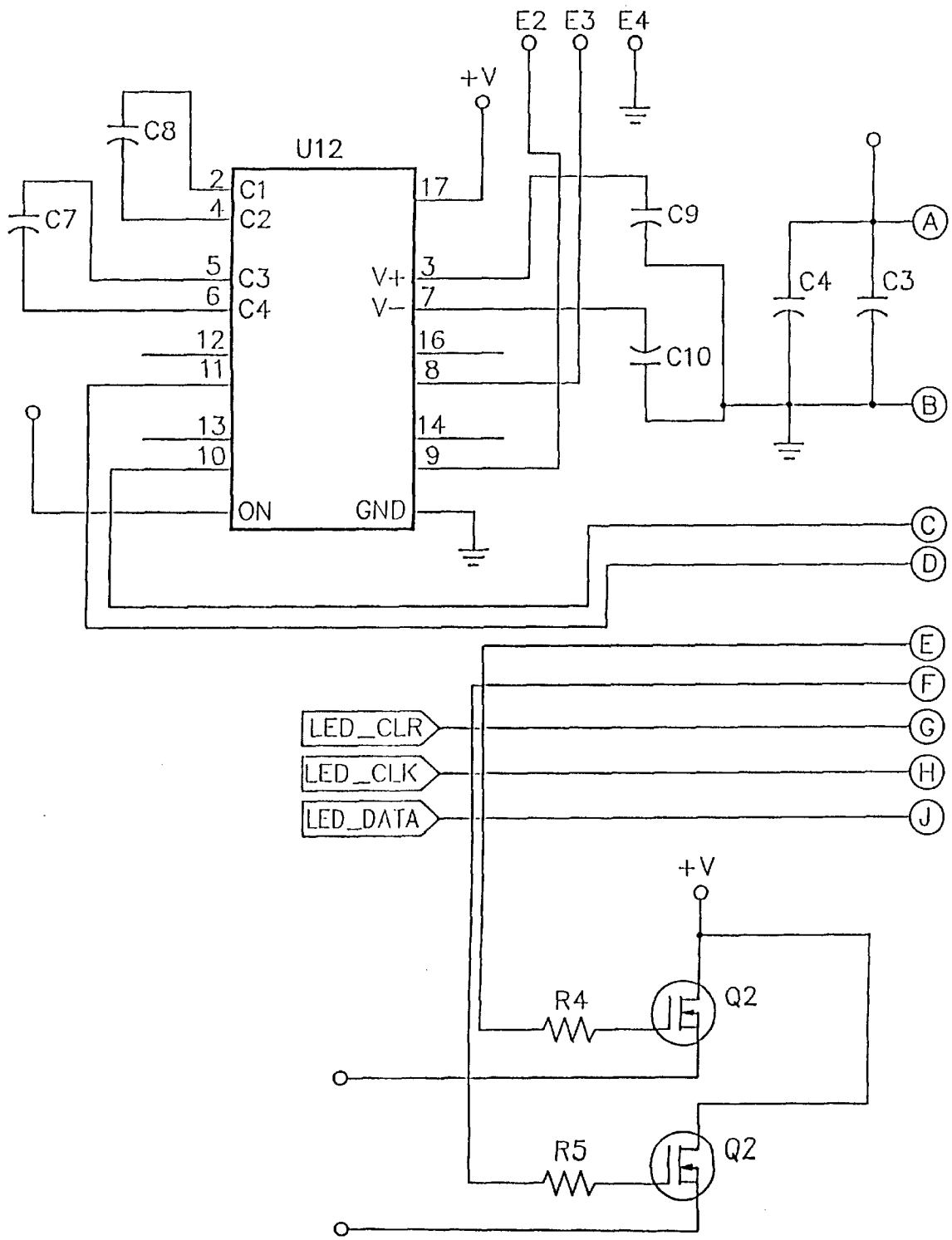
Figure 12B:
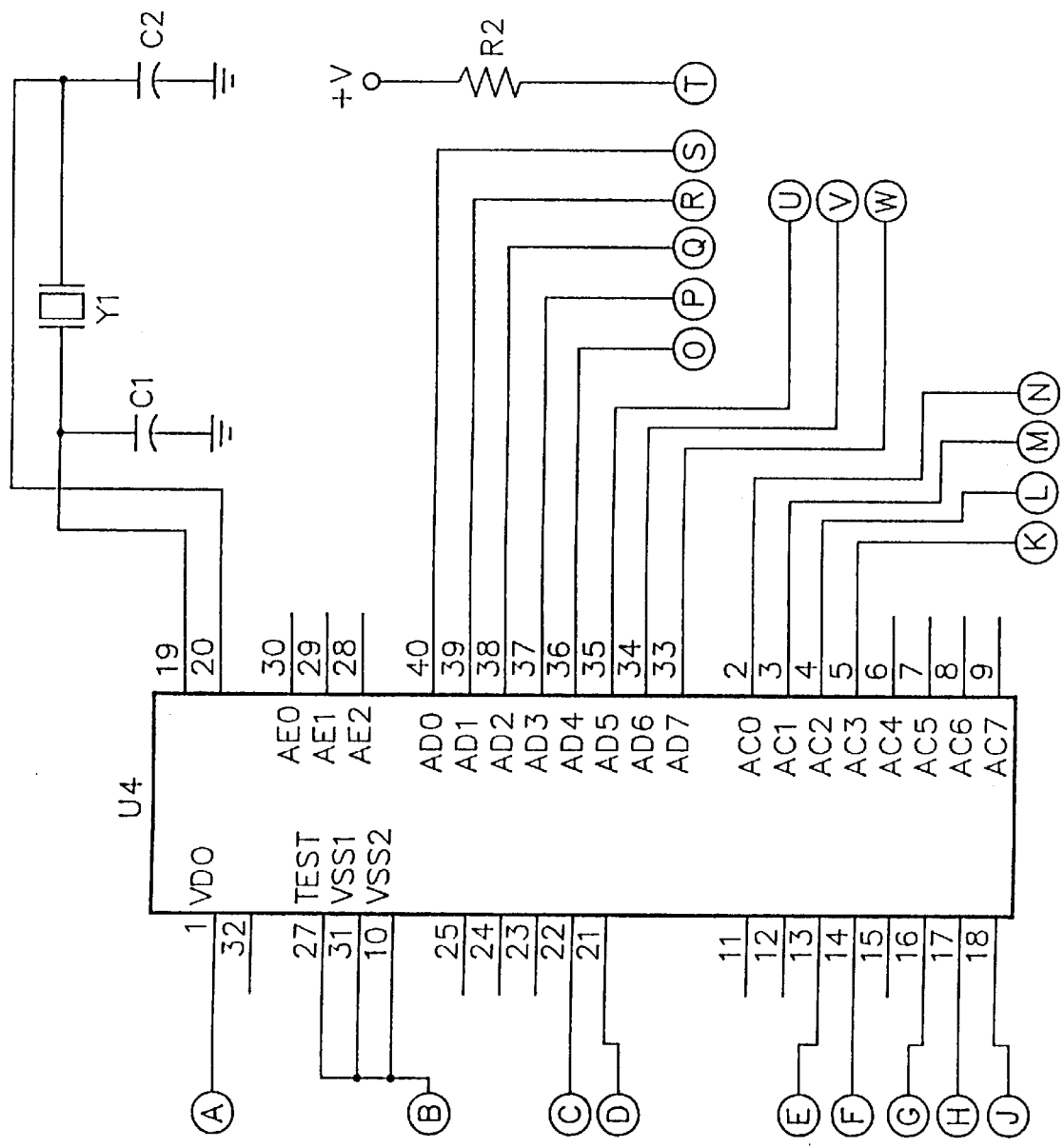
Figure 12C:
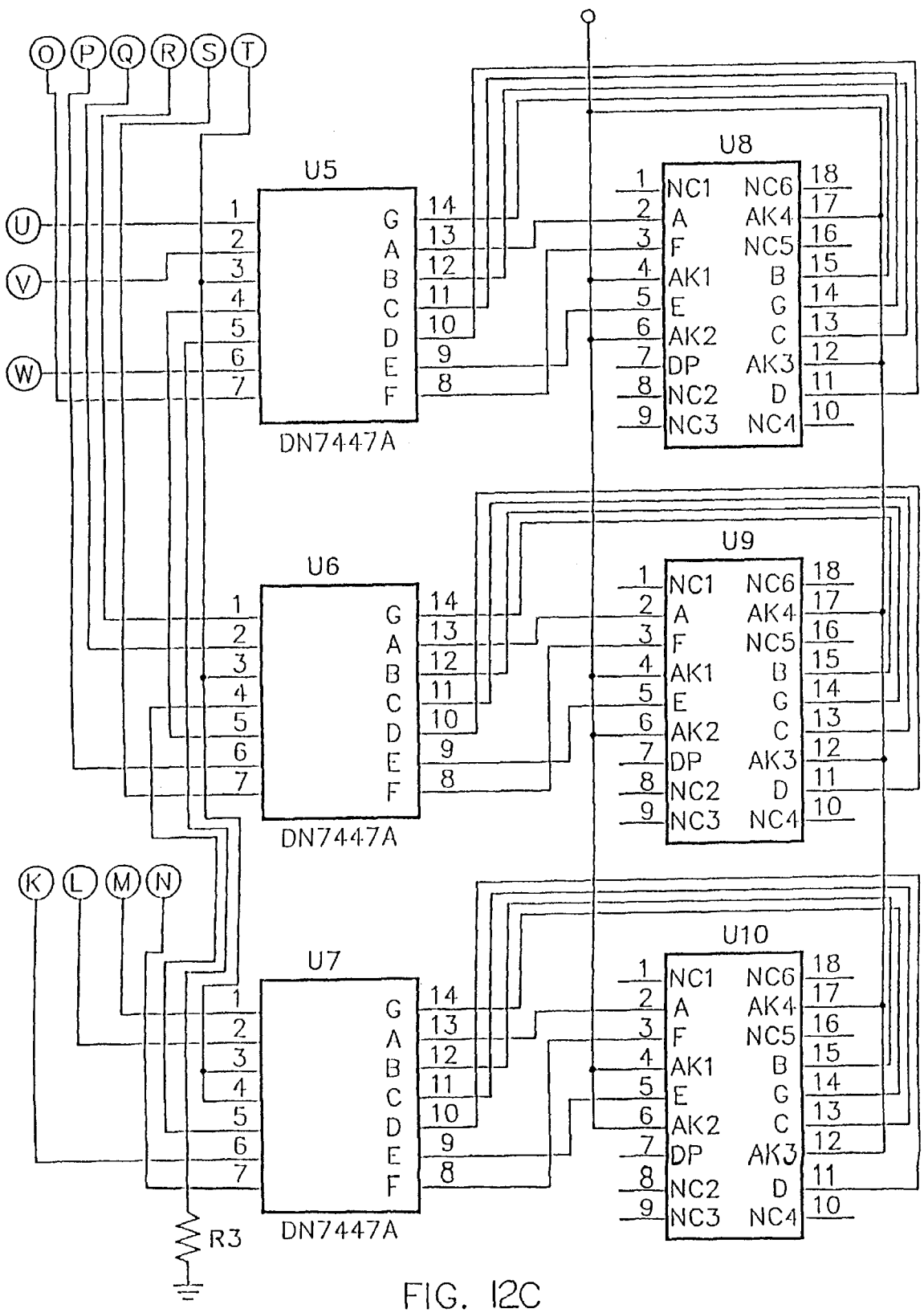

Referring now to FIG. 9, a side cutaway illustration of the swathing guidance device of the present invention is shown. The physical layout of the circuit boards and electronic interfaces are shown.

Referring now to FIGS. 10A–10G, 11, and 12A–12B, schematic diagrams of the electronic circuitry of a swathing guidance device in accordance with the present invention are shown. A preferred embodiment of the electronic circuitry of the swathing guidance device appear in FIGS. 10A–10G, 11 and 12A–12B. Other equivalent types of display control and driving circuitry may be utilized as well.

It is believed that the swathing guidance system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A swath guidance device for guiding an agricultural vehicle along a swath upon which an agricultural product may be applied, comprising:

a display having a center, said display comprising a guidance mode display and a navigation mode display; and said guidance mode display having a first plurality of vector indicators, each of said first plurality of vector indicators radially extending from the center on a first portion of said display for indicating a course heading correction for the agricultural vehicle to maintain travel along the swath, and said navigation mode display having a second plurality of vector indicators radially extending from the center on a second portion of said display for indicating a heading to a desired destination.

2. A swath guidance device as claimed in claim 1, wherein one of said plurality of vector indicators is a reference vector indicator indicating a course of the agricultural vehicle coincident with the swath.

3. A swath guidance device as claimed in claim 2, wherein a course heading correction for the agricultural vehicle is indicated by one of said plurality of vector indicators being disposed at an angle from the reference vector proportional to a course correction angle of the agricultural vehicle.

4. A swath guidance device as claimed in claim 1, wherein each of said plurality of vector indicators comprises at least one light.

5. A swath guidance device as claimed in claim 1, wherein each of said plurality of vector indicators comprises at least one diode.

6. A swath guidance device as claimed in claim 1, wherein each of said plurality of vector indicators comprises at least one light emitting diode.

7. A swath guidance device as claimed in claim 1, wherein each of said plurality of vector indicators comprises a row of light emitting diodes.

8. A swath guidance device for guiding an agricultural vehicle along a swath upon which an agricultural product may be applied, comprising:

a circular display having a center; and a plurality of vector indicators being radially disposed about the center of said display, said plurality of vector indicators indicating a course heading for the agricultural vehicle to a desired location, wherein a course heading for the agricultural vehicle is indicated by activation of a vector indicator being disposed at an angle proportional to the direction of a desired heading with respect to a forward direction of travel of the agricultural vehicle.

9. A swath guidance device as claimed in claim 8, wherein one of said plurality of vector indicators is a reference vector indicator indicating a vector coincident with the forward direction of travel of the agricultural vehicle.

10. A swath guidance device as claimed in claim 8, wherein each of said plurality of vector indicators comprises at least one light emitting diode.

11. A swath guidance device as claimed in claim 8, wherein each of said plurality of vector indicators comprises at least one light.

12. A swath guidance device as claimed in claim 8, wherein each of said plurality of vector indicators comprises at least one diode.

13. A swath guidance device for guiding an agricultural vehicle along a swath upon which an agricultural product may be applied, comprising:

a circular display having a center;

a first plurality of vector indicators, each of said first plurality of vector indicators radially extending from the center of said display, said plurality of vector indicators indicating a course heading correction for the agricultural vehicle to maintain travel along the swath; and a second plurality of vector indicators being radially disposed about the center of the display, said second plurality of vector indicators indicating a course heading for the agricultural vehicle to a desired location, wherein a course heading for the agricultural vehicle is indicated by activation of a vector indicator being disposed at an angle proportional to the direction of a desired heading with respect to a forward direction of travel of the agricultural vehicle.

14. A swath guidance device as claimed in claim 13, wherein one of said first plurality of vector indicators is a reference vector indicator indicating a course of the agricultural vehicle coincident with the swath.

15. A swath guidance device as claimed in claim 13, wherein each of said first plurality of vector indicators comprises at least one light.

16. A swath guidance device as claimed in claim 13, wherein each of said first plurality of vector indicators comprises at least one diode.

17. A swath guidance device as claimed in claim 13, wherein each of said first plurality of vector indicators comprises at least one light emitting diode.

18. A swath guidance device as claimed in claim 13, wherein each of said first plurality of vector indicators comprises a row of light emitting diodes.

19. A swath guidance device as claimed in claim 13, wherein one of said second plurality of vector indicators is a reference vector indicator indicating a vector coincident with the forward direction of travel of the agricultural vehicle.

20. A swath guidance device as claimed in claim 19, wherein a course heading for the agricultural vehicle is indicated by activation of a vector indicator being disposed at an angle from the reference vector proportional to the direction to the desired heading with respect to the forward direction of travel of the agricultural vehicle.

21. A swath guidance device as claimed in claim 13, wherein each of said second plurality of vector indicators comprises at least one light.

22. A swath guidance device as claimed in claim 13, wherein each of said second plurality of vector indicators comprises at least one diode.

23. A swath guidance device as claimed in claim 13, wherein each of said second plurality of vector indicators comprises at least one light emitting diode.

24. A swath guidance device as claimed in claim 13, wherein each of said second plurality of vector indicators comprises a row of light emitting diodes.

* * * * *